May 10, 1955 F. L. KUCHENBROD 2,708,118
CHUCK
Filed July 31, 1952 2 Sheets-Sheet 1

INVENTOR.
Frank L. Kuchenbrod
BY
Harness, Dickey & Pierce
ATTORNEYS.

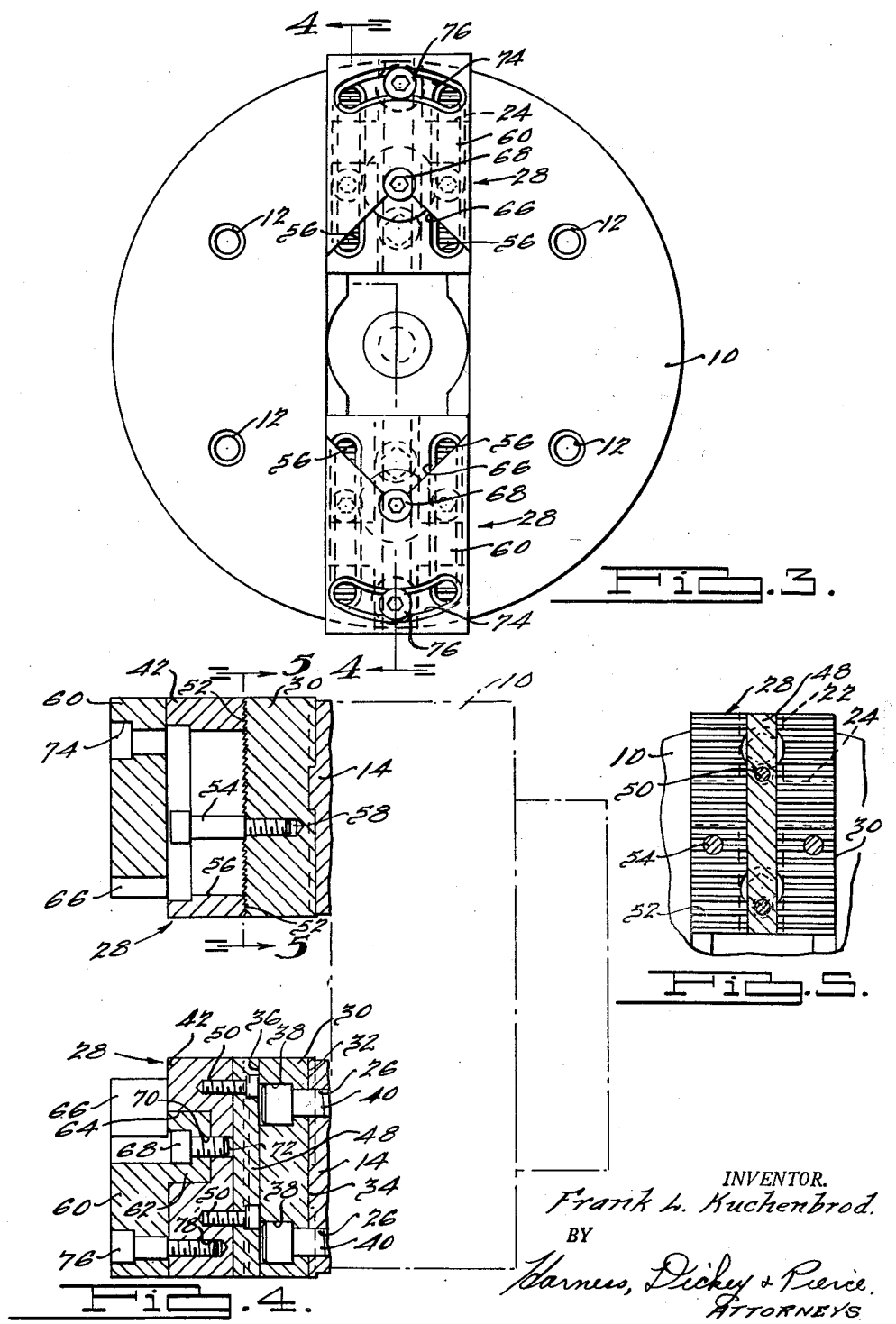

UNITED STATES PATENT OFFICE 2,708,118
Patented May 10, 1955

2,708,118

CHUCK

Frank L. Kuchenbrod, Berkley, Mich., assignor to C. M. Smillie and Co., Ferndale, Mich., a corporation of Michigan Application July 31, 1952, Serial No. 301,832

3 Claims. (Cl. 279—123)

This invention relates broadly to power chucks and more particularly to jaw assemblies uniquely constructed for attachment to the master jaws of a conventional power chuck and adapted to increase the range of adjustment of the chuck jaws and to enhance the versatility and usefulness of the chuck itself.

An important object of the present invention is to provide jaw assemblies that can be manufactured and sold as accessories for power chucks of conventional manufacture or that can be manufactured and sold as a part of the complete chuck assembly.

Another object of the invention is to provide a jaw assembly that will adapt itself more readily to a workpiece secured in the chuck, that is particularly suitable for holding workpieces of odd or irregular form and which is capable of holding such workpieces more securely than the clamping jaws of a conventional chuck.

Other objects and advantages of the invention will be apparent during the course of the following description.

In the drawings forming a part of this specification and wherein like numerals are employed to designate like parts throughout the same:

Fig. 3 is a front elevational view of the chuck assembly shown in Fig. 1;

Fig. 4 is a sectional view taken on the line 4—4 of Fig. 3; and

Fig. 5 is a sectional view taken on the line 5—5 of Fig. 4.

Figure 1:
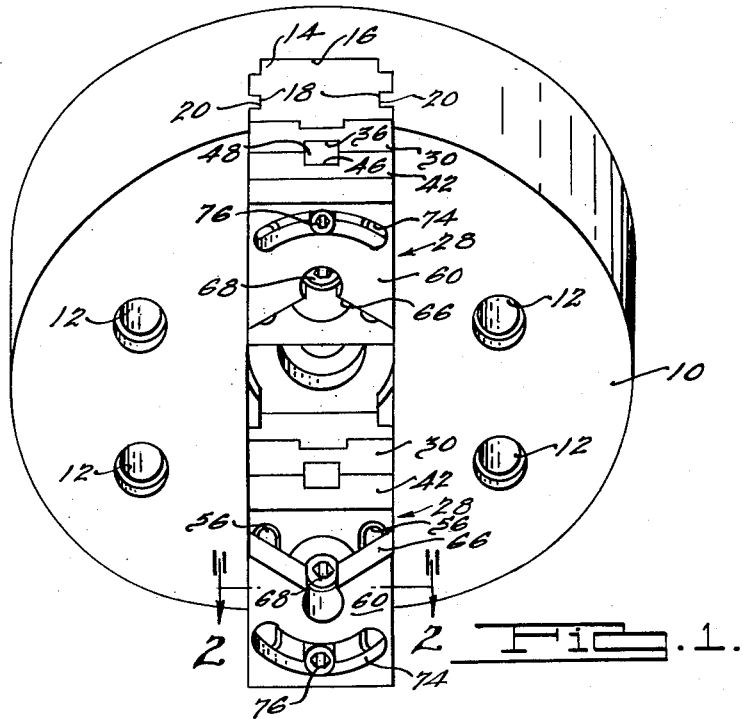
Fig. 1 is a perspective view showing a conventional power chuck having two master jaws, each equipped with a jaw assembly embodying the invention.
Figure 2:
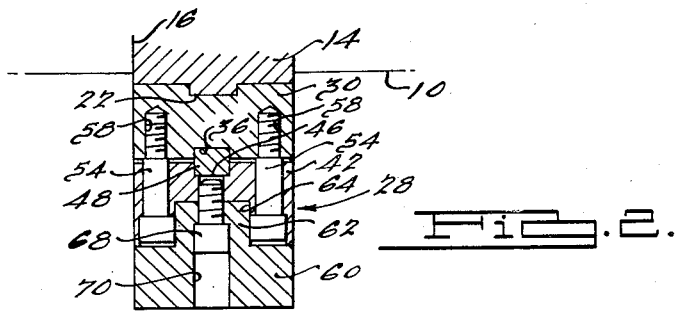
Fig. 2 is a fragmentary sectional view taken on the line 2—2 of Fig. 1.

In the drawings, wherein for the purpose of illustration is shown a preferred embodiment of the invention, the numeral 10 designates a generally disk-shaped chuck body of conventional construction having the usual holes 12 therein for attachment of the body to the driving spindle of a machine tool not shown. Master jaws 14 are mounted to travel in a diametrical way 16 provided in the front face of the chuck body 10. As clearly shown in the drawings, the jaws 14 are disposed equidistantly on opposite sides of the center of the body 10, and both jaws are movable longitudinally relative to each other in the way 16. In chucks of this type, the way 16 conventionally is provided at opposite sides thereof with inwardly projecting ribs 18 which fit in correspondingly shaped grooves 20 in the master jaws 14, and the interfitting parts hold the master jaws securely in the ways 16 without interfering in any way with free longitudinal travel of the jaws in the ways. Also, it is conventional practice to provide the master jaws 14 with suitable surface conformation, which hold work-holding jaws properly positioned on the master jaw, and holes for attachment of the work-holding jaws to the master jaws. To this end each of the master jaws 14 here shown is provided on the top surface thereof with a medianly disposed, longitudinal rib 22 and a generally medianly disposed transverse rib 24. A pair of longitudinally spaced threaded holes 26 are provided in each of the master jaws 14.

Suitable mechanism (not shown) conventionally is provided interiorly of the chuck body 10 for moving the master jaws 14 back and forth in the way 16. In conventional practice, the jaw-actuating mechanism varies, depending upon the particular manufacturer, and these mechanisms may be either mechanically, hydraulically, or pneumatically operated. It is to be understood that the jaw-operating mechanism comprises no part of this invention, and it is contemplated that any suitable or conventional power means may be employed for actuating the jaws 14.

Each master jaw 14 is equipped with a jaw assembly 28 embodying this invention, and each jaw assembly is separately movable with the jaw on which it is mounted. Thus, two jaw assemblies embodying the instant invention are illustrated on the chuck shown in the drawings.

There are conventional chucks of this type having more than two jaws, and it is contemplated that, in the practice of this invention, each master jaw of the chuck be equipped with a separate jaw assembly. A two-jaw chuck has been shown merely by way of illustration.

Each jaw assembly 28 is identical in construction, and a detailed description of but one, therefore, is given. Specifically, the jaw assembly 28 comprises a mounting block 30 adapted for mounting on and preferably conforming generally in size and shape to the top surface of the master jaw 14. The undersurface of mounting block 30 conforms exactly to the top surface of the mounting block so that it fits solidly thereon and is held securely thereby. To this end the undersurface of mounting block 30 is provided with a longitudinally groove 32 which receives and snugly fits the longitudinal rib 22 of the master jaw 14 and a transverse groove 34 which receives and snugly fits the transverse rib 24. Of course, it may be necessary to vary the undersurface configuration of the mounting block 30, depending upon the form and top surface configuration of the master jaw for which it is adapted. A longitudinally extending medianly disposed keyway 36 is provided in the top surface of mounting block 30, and countersunk holes 38 are provided in the bottom of the keyway for registration with the threaded holes 26 in the master jaw 14. Allen-head screws 40 are here shown fastening the mounting block 30 to the master jaw 14, and it will be observed that the heads of the screws are disposed below the bottom of the keyway 36. Manifestly, the longtitudinal and transverse ribs 22 and 24 of the master jaw 14 and the interfitting longitudinal and transverse grooves 32 and 34 of mounting block 30 effectively prevent the latter from shifting or moving in any direction on and relative to the master jaw, and the screws 40 hold the mounting block 30 securely attached to the mounting jaw.

Surmounting the block 30 is an adjusting block 42, and it is intended that the latter be longitudinally movable on and relative to the mounting block. To this end, the under surface of the adjusting block 42 is provided with a longitudinal keyway 46 in register with the keyway 36. A key 48 in the keyways 36 and 46 is attached to one or the other of the blocks 30 and 42 and is here shown attached to the adjusting block 42 by countersunk Allen-head screws 50. Thus, the adjusting block 42 is guided by the key 48 in its longitudinal travel on the mounting block 30. In addition, the key 48 at all times effectively prevents lateral shifting or displacement of the adjusting block 42. It is desirable that the confronting surfaces of the two blocks 30 and 42 at opposite sides of the key 48 seat flatly together in order to assure solid support for the adjusting block 42, and these two surfaces are here shown provided with interfitting transverse serrations 52 which hold the adjusting block securely in a selected, longitudinally adjusted position on the mounting block. Screws 54 in longitudinal slots 56 at opposite sides of the adjusting block 42 are screwed into correspondingly spaced holes 58 provided in the mounting block 30 substantially midway between the ends thereof. As perhaps best shown in Fig. 4, the slots 56 are countersunk so that the heads of screws 54 are disposed below the top surfaces of the adjusting block 42. When the screws 54 are loosened, the interengaging serrations 52 are released so that the adjusting block 42 is freely movable longitudinally on the mounting block 30 within limits defined by the slots 56. When screws 54 are tightened, they and the interengaging serrations 52 effectively hold the adjusting block 42 securely in a selected, longitudinally adjusted position on the mounting block 30.

On top of the adjusting block 42 is a V-block 60 having an embossment 62 on the undersurface thereof which extends into and snugly fits a correspondingly shaped recess or socket 64 provided in the top surface of adjusting block. The V-recess 66 of the block 60 is directed inwardly of the chuck, and a screw 68 in a hole 70 provided in the V-block at the apex of the V-recess extends into an internally threaded opening 72 provided in the adjusting block 42. Also, it will be observed that an arcuate slot 74 is provided in the back or rearward end of the V-block 60 and that a screw 76 extends through this slot and into an internally threaded hole 78 provided in the adjusting block 42. The arcuate slot 74 is struck on an arc extending from the center of the embossment 62, so that when the screws 68 and 76 are loosened, the V-block 60 is freely pivotally or angularly adjustable on the adjusting block 42 within limits defined by the arcuate slot 74. In this connection, it will be observed that the hole 70 is countersunk so that the screw 68 is disposed below the bottom of the V-recess 68 and below the top of the adjusting block 42. Similarly, the arcuate groove 74 is countersunk so that the screw 76 is disposed below the top of the V-block 60. When both of the screws 68 and 76 are tightened they hold the V-block securely in a selected, pivotally adjusted position.

In operation, the two jaw assembiles 28 are disposed with the V-recesses 66 thereof in confronting relation so as to receive opposite corners of a workpiece disposed therebetween. In setting up the chuck for a particular workpiece, the master jaws 14 are disposed in an intermediate position and the adjusting blocks 42 are moved longitudinally on the mounting blocks 30 until the workpiece fits snugly between the V-blocks 60. In this connection it will be observed that substantial longitudinal movement of the adjusting blocks 42 is possible so that the chuck is able to accommodate workpieces which vary considerably in size. During the setting up operation, the V-blocks 60 are loosened so that they can pivot as required to accommodate the work properly in the V-recesses 66. In practice it frequently happens that a workpiece is oblong or irregular in shape so that in some instances the V-blocks 60 must pivot substantially to one side or the other to accommodate the work. As soon as the proper longitudinally and pivotally adjusted positions of the parts have been determined, the screws holding the parts are tightened and all the parts of the jaw assemblies 28 are then positioned for proper engagement with the particular workpiece. The master jaws 14 are then operated in the conventional manner to clamp and unclamp the work.

It may thus be seen that I have achieved the objects of my invention. I have provided the jaws of a conventional chuck with jaw assemblies which substantially increase the range of adjustment of the chuck jaws and also increase the versatility and usefulness of the machine on which the chuck is mounted. The jaw assemblies can be easily and quickly adjusted to accommodate any workpiece that is capable of being supported between and clamped by the jaw assemblies, and in operation the jaw assemblies function efficiently to clamp the work.

Having thus described the invention, I claim:

1. A rotatable power chuck having slidable master jaws movable relative to each other, mounting blocks on and fixedly secured to respective master jaws, adjusting blocks on said mounting blocks individually adjustable radially with respect to the rotary axis of the chuck, keys interposed between said mounting and adjusting blocks, said keys being connected to one of said blocks and operable in ways provided in the other of said blocks, interengaging transverse serrations on the confronting surfaces of said mounting blocks and said adjusting blocks, longitudinal slots in said adjusting blocks and screws extending through said slots and into said mounting blocks cooperating with said serrations to hold the adjusting blocks in selected adjusted positions on said mounting blocks, and V blocks mounted for individual pivotal movement on said adjusting blocks, said V blocks being arranged with the V recesses thereof in confronting relation and disposed with the pivotal axes thereof parallel to the rotary axis of the chuck.

2. A rotatable power chuck having slidable master jaws movable relative to each other, mounting blocks on and fixedly secured to respective master jaws, adjusting blocks on said mounting blocks and radially adjustable relative to the rotary axis of the chuck, means for holding said adjusting blocks in selected adjusted positions on said mounting blocks, V blocks mounted for individual pivotal movement on said adjusting blocks and having arcuate slots around said pivot axes, and screws extending through said arcuate slots into said adjusting blocks for holding the V blocks in selected pivotally adjusted positions.

3. A rotatable power chuck having slidable master jaws movable relative to each other; mounting blocks on and fixedly secured to respective master jaws; adjusting blocks on said mounting blocks provided with longitudinal slots therein; screws extending through said longitudinal slots into said mounting blocks detachably fastening said adjusting blocks thereto; keys disposed longitudinally between said adjusting blocks and said mounting blocks, said keys being connected to one of said blocks and operable in longitudinal ways provided in the other of said blocks; interengaging transverse serrations on the confronting surfaces of said mounting and adjusting blocks, said keys guiding said adjusting blocks for longitudinal movement on said mounting blocks within limits defined by said slots and said screws co-operating with said serrations to hold the adjusting blocks in selected, adjusted positions on the mounting blocks; V blocks on said adjusting blocks having embossments on the undersurfaces thereof extending into corresponding recesses in the top surfaces of said adjusting blocks and provided with arcuate slots around the centers of said embossments; and screws extending through said arcuate slots into said adjusting blocks, said embossments supporting the V blocks for pivotal adjustment on said adjusting blocks and said last-mentioned screws holding said V blocks in selected, pivotally adjusted positions.

References Cited in the file of this patent

UNITED STATES PATENTS

| | | |
|---|---|---|
| 1,020,492 | Griggs et al. | Mar. 19, 1912 |
| 1,033,547 | Cornil | July 23, 1912 |
| 1,453,045 | Forster | Apr. 24, 1923 |
| 1,766,276 | Berg | June 24, 1930 |
| 1,794,511 | Bush | Mar. 3, 1931 |
| 2,514,472 | Cassidy | July 11, 1950 |
| 2,543,117 | Mackmann | Feb. 27, 1951 |
| 2,569,056 | Highberg | Sept. 25, 1951 |
| 2,590,509 | Church | Mar. 25, 1952 |
| 2,669,458 | Johnson | Feb. 16, 1954 |